United States Patent
Onaizi et al.

(10) Patent No.: US 12,145,103 B1
(45) Date of Patent: *Nov. 19, 2024

(54) HETEROGENEOUS CATALYST FOR HYDROCARBON SWEETENING

(71) Applicant: KING FAHD UNIVERSITY OF PETROLEUM AND MINERALS, Dhahran (SA)

(72) Inventors: Sagheer A. Onaizi, Dhahran (SA); Reyad Shawabkeh, Dhahran (SA); Zuhair Omar Malaibari, Dhahran (SA); Nabeel Salim Abu-Ghander, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/776,312

(22) Filed: Jul. 18, 2024

Related U.S. Application Data

(60) Continuation of application No. 18/307,835, filed on Apr. 27, 2023, now Pat. No. 12,083,476, which is a
(Continued)

(51) Int. Cl.
  *B01J 27/12* (2006.01)
  *B01D 53/52* (2006.01)
  (Continued)

(52) U.S. Cl.
  CPC ......... *B01D 53/8612* (2013.01); *B01D 53/52* (2013.01); *B01D 53/80* (2013.01);
  (Continued)

(58) Field of Classification Search
  None
  See application file for complete search history.

(56) References Cited

U.S. PATENT DOCUMENTS

| | | | |
|---|---|---|---|
| 3,849,540 A | 11/1974 | Maddox, Jr. et al. | |
| 3,928,211 A | 12/1975 | Browning et al. | |
| (Continued) | | | |

FOREIGN PATENT DOCUMENTS

| | | |
|---|---|---|
| CN | 106423063 A | 2/2017 |
| WO | WO 2015/116864 A1 | 8/2015 |

OTHER PUBLICATIONS

W.A. Bakar, et al., "Titanium and Copper Oxide Based Catalysts for the Insitu Reactions of Methanation and Desulfurization in the Removal of Sour Gases from Simulated Natural Gas" Journal of Fundamental Sciences, vol. 5, Issue 2, Dec. 17, 2009, pp. 99-105.
(Continued)

*Primary Examiner* — Daniel Berns
(74) *Attorney, Agent, or Firm* — Oblon, McClelland, Maier & Neustadt, L.L.P.

(57) ABSTRACT

A two or particularly three-phase process, and corresponding apparatus, desulfurizes sour hydrocarbon gas, e.g., natural gas, generally better than known, using a fixed-bed, two-phase processes in terms of the amount of $H_2S$ scavenged and the breakthrough time of $H_2S$. The three-phase process is effective in scavenging $H_2S$ at ambient temperature and pressure, using a copper salt catalyst impregnated on alumina or other generally inert support, which is regenerable.

7 Claims, 6 Drawing Sheets

Related U.S. Application Data division of application No. 16/230,753, filed on Dec. 21, 2018, now Pat. No. 11,731,080.

(51) Int. Cl.
| | |
|---|---|
| *B01D 53/80* | (2006.01) |
| *B01D 53/86* | (2006.01) |
| *B01J 21/04* | (2006.01) |
| *B01J 27/055* | (2006.01) |
| *B01J 27/122* | (2006.01) |
| *B01J 27/25* | (2006.01) |
| *C10L 3/10* | (2006.01) |
| *B01J 21/18* | (2006.01) |

(52) U.S. Cl.
CPC ........... *B01J 27/055* (2013.01); *B01J 27/122* (2013.01); *B01J 27/25* (2013.01); *C10L 3/103* (2013.01); *B01D 2255/20761* (2013.01); *B01D 2256/24* (2013.01); *B01D 2256/245* (2013.01); *B01D 2257/304* (2013.01); *B01J 21/04* (2013.01); *B01J 21/18* (2013.01); *B01J 2523/17* (2013.01)

(56) References Cited

U.S. PATENT DOCUMENTS

| | | | |
|---|---|---|---|
| 4,153,547 A | 5/1979 | McLean | |
| 4,478,800 A | 10/1984 | van der Wal et al. | |
| 4,880,609 A | 11/1989 | Naraghi | |
| 5,114,689 A | 5/1992 | Nagji et al. | |
| 5,215,728 A | 6/1993 | McManus | |
| 5,700,438 A | 12/1997 | Miller | |
| 5,763,350 A | 6/1998 | Immel et al. | |
| 6,444,185 B1 | 9/2002 | Nougayrede et al. | |
| 6,495,117 B1 | 12/2002 | Lynn | |
| 6,881,389 B2 | 4/2005 | Paulsen et al. | |
| 6,946,111 B2 | 9/2005 | Keller et al. | |
| 6,960,330 B1 | 11/2005 | Cox, Jr. | |
| 7,235,697 B2 | 6/2007 | Muller et al. | |
| 7,837,964 B2 | 11/2010 | Wessel et al. | |
| 8,002,971 B2 | 8/2011 | Kozyuk | |
| 8,071,046 B2 | 12/2011 | Hassan et al. | |
| 8,071,146 B2 | 12/2011 | Erasmus et al. | |
| 9,480,946 B2 | 11/2016 | Ramachandran et al. | |
| 9,587,181 B2 | 3/2017 | Lehrer et al. | |
| 12,083,476 B2 * | 9/2024 | Onaizi | B01D 53/52 |
| 2012/0316363 A1 | 12/2012 | Gao | |
| 2019/0270957 A1 | 9/2019 | Kao | |
| 2020/0030777 A1 | 1/2020 | Al-Jabri | |

OTHER PUBLICATIONS

O. Bereketidou et al., "Simultaneous removal of NO and SO2 from combustion flue gases using copper oxide catalysts supported on CeO2/y-Al2O3" Conference Paper, Aug. 2009, pp. 1-2.

* cited by examiner

HETEROGENEOUS CATALYST FOR HYDROCARBON SWEETENING

CROSS-REFERENCE TO RELATED APPLICATIONS

The present application is a Continuation of U.S. application Ser. No. 18/307,835, now allowed, having a filing date of Apr. 27, 2023 which is a Division of U.S. application Ser. No. 16/230,753, now U.S. Pat. No. 11,731,080 having a filing date of Dec. 21, 2018.

BACKGROUND OF THE INVENTION

Field of the Invention

The present application relates to methods and apparatuses for desulfurizing petrochemical gases, particularly natural gas.

Description of the Related Art

Hydrogen sulfide ($H_2S$) is a colorless and highly corrosive and toxic gas that exists in natural gas and also in other gases. The average $H_2S$ concentration in natural gas is 4 ppmv at STP, which is considered the threshold value for sweetening raw gas(es) to product gas(es). The existence of $H_2S$ even at low concentrations leads to localized corrosion and also causes stress cracking. Therefore, $H_2S$ gas should be scavenged because it causes damage to the pipelines, valves and surfaces of process equipment.

Several technologies have been practiced industrially for sweetening (e.g., removing hydrogen sulfide) hydrocarbons and natural gas. These methods mainly employ adsorption by amine solutions or adsorption on carbonaceous or metal oxide adsorbents. These techniques suffer from high processing costs, amine-based corrosion problems, limited selectivity, and by-product generation. These problems, in part, have necessitated development efforts for a solution. Thus, efforts towards scavenging $H_2S$ from natural gas and other sour gases have been made.

For example, U.S. Pat. No. 7,235,697 to Muller et al. (Muller) relates to a process for preparing thiols, thioethers and disulfides by reacting olefins with hydrogen sulfide in the presence of water and carbon dioxide. However, Muller does not describe particular metals, nor desulfurization. In another approach, U.S. Pat. No. 6,881,389 to Paulsen et al. (Paulsen) describes a system for removal of $H_2S$ and/or $CO_2$ from natural gas via absorption and disassociation utilizing a sea water contact system with a series of counter current scrubber stages, each configured to remove via absorption/disassociation a portion of the impurities, each stage having less pressure than the predecessor, each stage redirecting the purified gas to the preceding stage, until the contaminant level in the hydrocarbon gas stream has been reduced to an acceptable level. Paulsen's $H_2S/CO_2$ contaminants are sequestered in the sea water used in a scrubber. The sea water may be further processed and/or re-introduced into a deep body of water where the contaminants will remain isolated for hundreds of years. Paulsen does not describe a metal catalyst, and particularly not copper.

U.S. Pat. No. 8,071,046 to Hassan et al. (Hassan) describes an apparatus and method for removing $H_2S$ from a sour gas stream comprising $H_2S$, by oxidizing $H_2S$ in a converter by contacting the sour gas stream with an aqueous catalytic solution, thereby producing a desulfurized gas stream and a liquid stream comprising reduced catalyst and elemental sulfur, introducing an oxidant and the liquid stream comprising reduced catalyst and elemental sulfur into a high shear device and producing a dispersion wherein the mean bubble diameter of the oxidant gas in the dispersion is less than about 5 μm, introducing the dispersion into a vessel from which a sulfur-containing slurry is removed and a regenerated catalyst stream is removed, wherein the sulfur slurry comprises elemental sulfur and aqueous liquid, and recycling at least a portion of the regenerated catalyst stream to the converter. However, Hassan does not disclose a copper catalyst, but instead uses an Fe-based material. Hassan requires a high shear device and a chelate in its homogeneous system.

U.S. Pat. No. 3,928,211 to Browning et al. (Browning) describes a process for scavenging $H_2S$, e.g., in aqueous drilling fluids, and preventing metallic corrosion of iron drill pipe and the like by using metal compounds that form aqueous insoluble sulfides. Its metal compounds contain metals with greater electromotive activity than Fe. Browning introduces the metal compounds into an aqueous drilling fluid and circulates the fluid in the well bore, either by prior preparation or in situ formation. Browning's metal compounds may include $ZnCO_3$, $ZnCO_3 \cdot Zn(OH)_2$, or $Zn(OH)_2$, or a dispersion of a zinc compound reacted with an organic material. While Browning may use a heterogeneous catalyst, it does not use a copper-containing catalyst, nor does Browning use a support.

U.S. Pat. No. 6,960,330, to Cox (Cox) describes compositions, methods, and systems useful for reducing a concentration of a contaminant, esp. $H_2S$, associated with a medium, which can be any substance or material, such as soil, water, air, and/or fluid. Cox's medium is treated with ferric methylglycinediacetate, i.e., Fe-MGDA, and an oxidizing agent in amounts effective to oxidize at least a portion of the contaminant. Cox prefers reducing hydrogen sulfide content by adding Fe-MGDA and a peroxide to a medium with a hydrogen sulfide content; and reducing the hydrogen sulfide content in the medium. However, Cox does not indicate using copper in its catalyst, Cox requires an oxidizing agent, Cox generally describes treating condensed phases, and Cox's system Fe-MGDA and/or oxidizing agent must be a fluid, including liquid, vapor, and/or aerosol form, but not heterogeneous.

U.S. Pat. No. 6,946,111 to Keller et al. (Keller) describes a process for removing sulfur from a $H_2S$-containing gas stream, preferably involving incorporating a short contact time catalytic partial oxidation reactor, a cooling zone, and a condenser into a conventional refinery or gas plant process, such as a natural gas desulfurizer, a hydrotreater, coker or fluid catalytic cracker, in which sulfur removal is needed in order to produce a more desirable product. Keller's $H_2S$-containing gas stream is fed into a short contact time reactor where the $H_2S$ is partially oxidized over a suitable catalyst in the presence of $O_2$ to elemental sulfur and water. While Keller's system may optionally use a support, such as $Al_2O_3$, $ZrO_2$, or partially stabilized (MgO) zirconia (PSZ), Keller's system uses Pt, Rh, Ni, Pd, Ru, and/or Ir, not copper, and Keller's system operates at 700° C. or above.

U.S. Pat. No. 6,495,117 to Lynn (Lynn) describes recovery of elemental sulfur from $H_2S$ present in natural gases and other process gases by treating the $H_2S$-containing gas in a series arrangement of a liquid-phase reactor; a furnace and a $SO_2$ absorber. Lynn feeds a $H_2S$—and a $SO_2$-containing gas into the liquid-phase reactor where they are dissolved into a solvent, such as polyglycol monoethers, diethers of ethylene glycol, diethers of propylene glycol, etc., and react in the presence of a catalyst, such as a tertiary amine, pyridine, isoquinoline, etc., to produce elemental sulfur. Lynn's $H_2S$- and $SO_2$-gas feed rates allow an excess of $H_2S$ in the solvent, ensuring that reaction products include elemental sulfur and residual, unreacted $H_2S$, which is fed into a furnace, combusted into a $SO_2$-containing gas, which is fed into a $SO_2$ absorber, where the $SO_2$ is extracted from the gas and recycled back to the liquid phase reactor as the $SO_2$-containing gas. Lynn does not teach a copper catalyst, but instead a Claus catalyst ($TiO_2$ and/or $Al_2O_3$), and Lynn teaches using a glycol ether solvent and a tertiary amine catalyst, and Lynn's system is homogeneous.

U.S. Pat. No. 5,215,728 to McManus (McManus US) describes a method and apparatus for the hydrothermal treatment of a catalytic polyvalent metal redox absorption solution, after absorption of the $H_2S$ from an $H_2S$ containing gas stream, to avoid substantial buildup of thiosulfate salts, cyanide salts, and cyanide complexes in the catalytic polyvalent metal redox solution. McManus US treats gas streams with both $H_2S$ and HCN concurrently to destroy cyanide salts and complexes and converts $H_2S$ and by-product salts to elemental sulfur. McManus US does not use a copper catalyst, but rather Fe or V, and operates above 200° C. and 100 bar. EP 257 124 A1 by McManus et al. (McManus EP) describes hydrogen sulfide oxidation-catalyst regeneration process using an aqueous chelated polyvalent metal catalyst solution, like McManus US, but modifies this with certain stabilizers, such as nitrilotriacetic acid (NTA).

U.S. Pat. No. 5,114,689 to Nagji et al. (Nagji) describes a system and a process with a primary adsorption bed with a regenerable, physical adsorbent and an auxiliary sorption bed containing a chemisorbent for the removal of sulfur compounds from a fluid stream, which process provides for higher yields, higher purity and lower costs. Nagji uses a zeolite support, optionally ion exchanged with zinc, copper or iron cations, but does not disclose anything beyond ZnO as its catalyst metal.

WO 2015/116864 A1 by Martin (Martin) discloses a family of metal chelates for use as an $H_2S$ scavenger in asphalt, and the preparation thereof. Martin particularly uses amino acid metal chelates for reducing the $H_2S$ emissions of asphalt. While Martin's chelates may include B, Ca, Cr, Cu, Fe, Li, Mg, Mn, Mo, Na, K, Se, Sr, V, or Zn, particularly Cu or Zn, Martin does not disclose heterogeneous catalysis. Moreover, Martin requires an amino acid complex, uses no support, and adds catalysts into a solid phase (or tar or Bingham fluid), rather than as a supported catalyst in a fluid, particularly water.

U.S. Pat. No. 9,587,181 to Lehrer et al. (Lehrer) describes that using a composition including a transition metal salt and a water-soluble aldehyde or precursor to scavenge $H_2S$ present in aqueous fluids (e.g. produced water liquid streams), natural gas, and in oil and mixtures thereof (e.g. mixed production streams that contain all three phases), is better than either component when used alone. Lehrer's scavenger combination increases the reaction rate and the overall scavenging efficiency, i.e., capacity in comparison to the individual components used alone, in the same total amount. Examples of Lehrer's metal salt include Zn or Fe carboxylates, and an example of a water-soluble aldehyde or water-soluble aldehyde precursor is ethylene glycol hemiformal. While Lehrer may describe suitable metal salts to include various Zn, Cu, Co, Mn, Fe, and/or Mo salt(s), Lehrer fails to disclose that copper catalysts must be used, and Lehrer employs homogeneous catalyst systems.

U.S. Pat. No. 9,480,946, to Ramachandran et al. (Ramachandran) describes a transition metal carboxylate scavenger that may be used to scavenge contaminants from systems from mixed production and/or gas, either dry or wet hydrocarbon gas. The contaminants scavenged or otherwise removed may include, but are not necessarily limited to, $H_2S$, mercaptans, sulfides, and combinations thereof. Suitable non-limiting transition metal carboxylates in Hassan's scavenger include Zn octoate, Zn dodecanoate, Zn naphthenate, and combinations thereof. Ramachandran may use salt(s) of zinc, iron, copper, cobalt, calcium, manganese, "etc., and the like," or mixtures of these, without any indication of the utility of copper particularly, nor its use without a carboxylate. Moreover, Ramachandran uses a homogeneous catalyst.

U.S. Pat. No. 5,700,438, to Miller (Miller) describes a process for removing $H_2S$ and mercaptans from gas streams, involving contacting such gas streams with an aqueous solution of a copper complex of a water soluble amine to form water insoluble copper sulfide and regenerate free water soluble amine. Miller removes and recovers copper sulfide from the system. An additional copper complex of the water soluble amine is formed by reacting the regenerated water soluble amine with a copper compound. Miller's process contacts $H_2S$ gas streams with an aqueous solution of a complex of copper with a water soluble amine to form water insoluble CuS, then regenerates free water soluble amine. While Miller's system uses a copper-based catalyst, the catalyst lacks a support and must be combined with an amine suitable to form a stable (tris)amino copper complex but incapable of complexing copper sulfides, and Miller prefers not to use copper salts such as sulfates, nitrates, and chlorides.

U.S. Pat. No. 4,153,547 to McLean (McLean) discloses desulfurizing well water and making it palatable, by treating water with excess acidified copper sulfate or other metal salt, precipitating and removing CuS from the water in a filter tank to obtain sulfur-free neutral water. Excess $CuSO_4$ is precipitated as $Cu(OH)_2$ and removed in a filter. Mclean's filter tank automatically (or manually) backwashes to remove the copper residues. While McLean uses a copper catalyst, McLean uses a homogeneous, unsupported copper sulfate, and preferably at an acidic pH, e.g., no more than 4.

U.S. Pat. No. 4,880,609 to Naraghi (Naraghi) describes a solution process for removing $H_2S$ from a stream of natural gas. Sodium nitrite in the solution serves as an oxidizing agent for the $H_2S$. Buffering and defoaming agents are added. Absent a catalyst, Naraghi's process suffers from conversion of $NO_2$ into $NH_3$ which conversion is suppressed by the incorporation of a transition metal chelate complex. Naraghi's metal is preferably Cr, Cu, or Fe, or acceptably Mn, Ni, or V, and the chelate complex is preferably EDTA or TEA, or acceptably HEEDTA or NTA. Naraghi's metal chelate complex catalyzes the $NaNO_2$ oxidation of $H_2S$, markedly enhancing sulfur recovery as a precipitate in solution. Naraghi does not use a support, discloses homogeneous catalysis, requires nitrite as well as an (amine) chelate, and further requires a pH of 7.0 to 11, preferably with a buffering agent.

U.S. Pat. No. 3,849,540 to Maddox et al. (Maddox) describes a process for removing $H_2S$ from natural gas comprising: (a) oxygenating an aqueous solution consisting of a soluble catalyst consisting of transition metal compounds including salts of Ni, Co, Mn, Cu, and Fe; (b) removing entrained but undissolved oxygen from the aqueous solution; and (c) treating hydrogen sulfide containing natural gas with the oxygen rich aqueous solution of (b) at atmospheric pressure. Maddox prefers a Ni catalyst and uses a water-soluble transition metal compound in a homogeneous system, and enough dissolved oxygen to stoichiometrically react with $H_2S$. Maddox does not describe using a support for its catalyst.

U.S. Pat. No. 8,002,971 to Kozyuk (Kozyuk) describes processes and systems for hydrodynamic cavitation-catalyzed oxidation of sulfur-containing substances in a fluid. Carbonaceous fluid may be combined with at least one oxidant to form a mixture, then the mixture is flowed through at least one local constriction in a flow-through chamber at a sufficient pressure and flow rate to create hydrodynamic cavitation in the flowing mixture having a power density of between about 3,600 and 56,000 kWatts/cm2 measured at the surface of the local constriction normal to the direction of fluid flow. The creation of hydrodynamic cavitation in the flowing mixture initiates one or more chemical reactions that, at least in part, oxidize at least some of the sulfur-containing substances in the carbonaceous fluid. Kozyuk's system may include a device configured to mix a carbonaceous fluid and oxidant(s), a cavitation chamber configured to produce cavitation bubbles in the mixture, and an elevated pressure zone configured to collapse the cavitation bubbles, thereby catalyzing oxidation of the sulfur-containing substances. While Kozyuk's optional metal catalyst may include Fe(II or III), Cu(I or II), Cr(III or VI), Mo, W, or V ions, Kozyuk does not disclose a support. Kozyuk requires an oxidizing agent, such as a peroxide or ozone.

U.S. Pat. No. 6,444,185 to Nougayrede et al. (Nougayrede) describes process to recover $H_2S$, $SO_2$, COS, and $CS_2$ residues from the tail gas of a sulfur recovery process. The tail gas is oxidized and hydrolyzed at from 180 to 700° C. to form a gas stream with substantially no COS or $CS_2$ and a concentration by volume of $H_2S$ and $SO_2$ such that the $H_2S$ concentration minus twice the $SO_2$ concentration is from 0.25 to 0.5%. Then the gas stream is passed over a Claus catalyst, e.g., alumina and/or titanium oxide, to react $H_2S$ with $SO_2$ to form sulfur and provide a gas stream with substantially no $SO_2$. Nougayrede's resulting gas stream together with an $O_2$-containing gas is passed over an oxidation catalyst, such as one of more oxides or salts of Ni, Co, Fe, Cu, Ag, Mn, Mo, Cr, W, or V, deposited on a support, such as bauxite, activated alumina, silica, titania, zirconia, zeolites, or activated carbon to form sulfur and release a purified gas stream containing substantially no sulfur compounds. Nougayrede does not specifically combine Cu on alumina but discloses a multistage arrangement separately involving minimum temperatures of 180 and 90° C., as well as at least two separate catalysts, including a Claus catalyst.

U.S. Pat. No. 4,478,800 to Willem et al. (Willem) describes removing sulfur compounds from gases by passing the gases over an absorption mass on an inert support having a specific surface area of more than 10 $m^2/g$, contains metal oxides which react with $H_2S$ to give metal-sulfur compounds and at least 20% by weight of which metal oxides are present in finely divided form with a particle size of less than 40 nm. Willem's gases are passed at 5 to 800° C. over the support loaded with metal oxide, and the resultant support loaded with metal-sulfur compounds is regenerated by passing gases containing oxidizing agents over it. Willem's catalysts contain Cr, Co, Cu, Fe, Mn, V, Bi, Cd, Pb, Sn, as metal oxides, and Willem describes a variety of supports, including alumina, but Willem does not specify copper on alumina, and requires at least 20 wt. % of its supported metal oxides having a particle size less than 40 nm, also preferring an at least 20 wt. % loading on its support.

U.S. Pat. No. 5,763,350 to Immel et al. (Immel) describes catalysts for removing sulfur compounds almost completely from industrial gases. The Immel catalysts are made by impregnating a suitable support with an oxide of at least one element selected from Group VIB of the periodic table and at least two other oxides of Group IB, IIB, VIB, and/or VIIIB elements. Industrial gases having sulfur compounds are brought into contact with these catalysts under conditions to convert the sulfur compounds to elemental sulfur, thus removing sulfur from the industrial gas. Immel discloses metal oxide catalysts, such as Cu, Zn, Cr, Mo, W, Fe, Co, or Ni, and requires a mixture of oxides of at least three metals.

The article entitled "Titanium and Copper Oxide Based Catalysts for the. In-situ Reactions of Methanation and Desulfurization in the Removal of Sour Gases from Simulated Natural Gas" by Bakar et al. (Bakar), in *Malay. J. Fund. Appl. Sci.,* 2009, 5 (2), 293 (2289-599x), describes catalysts to achieve both low temperature and high conversion of sour gases. Bakar describes supported mixed metal oxide catalysts, prepared by impregnating the catalysts on alumina beads, for in-situ reactions of $H_2S$ desulfurization and $CO_2$ methanation at room temperature up to 200° C. Bakar reports 100% conversion of $H_2S$ to elemental sulfur for all of its catalysts at 100° C., but that methanation of $CO_2$ in the presence of $H_2S$ yielded 0.4% $CH_4$ over Fe/Zn/Cu/Ti—$Al_2O_3$ catalyst and 0.7% $CH_4$ over Fe/Zn/Cu—$Al_2O_3$ catalyst at its maximum studied temperature of 200° C. XPS results indicated that spinel compounds of $CuFe_2O_4$ and $Fe_3O_4$ act as the active sites on the Fe/Zn/Cu—$Al_2O_3$ and Fe/Zn/Cu/Ti—$Al_2O_3$ catalysts. The appearance of $Fe^{3+}$—OH on Fe/Zn/Cu/Ti—$Al_2O_3$ catalyst increased its $H_2S$ desulfurization activity. Bakar reports that $N_2$ adsorption-desorption analysis illustrated that 34% of the surface area of Fe/Zn/Cu—$Al_2O_3$ catalyst was reduced, while Fe/Zn/Cu/Ti—$Al_2O_3$catalyst showed reduction of 17% after catalytic testing, indicating deactivation of the catalysts from sulfur poisoning. Bakar requires at least two further metals in at least 10 wt. % when using a copper catalyst.

The conference paper entitled "Simultaneous removal of NO and $SO_2$ from combustion flue gases using copper oxide catalysts supported on $CeO_2/\gamma$-$Al_2O_3$," from the EuropaCat IX, in Salamanca, Spain, in August of 2009, by Bereketidou et al. (Bereketidou) discloses catalytic materials with improved performance towards the simultaneous $SO_2$ and NO removal is, in any case needed, as the development of appropriate techniques for combustion flue gases purification consists one of the principal topics in environmental catalysis, particularly after stricter legislation being induced from European Union. The copper oxide (CuO) on $CeO_2/Al_2O_3$ supported catalysts studied in this work, exhibit remarkable regenerative behavior and stability acting both as catalysts for nitric oxide (NO) selective reduction (SCR) and as sorbents for sulfur dioxide ($SO_2$) to form copper sulfate.

Bereketidou discloses copper oxide catalysts on alumina, but uses no more than 8 wt. % copper and uses a 10 to 20 wt. %-Ce doped alumina support. Moreover, Bereketidou removes of NO and $SO_2$ from combustion flue gases, rather than removing $H_2S$, and operates at a temperature of at least 150° C.

U.S. Pat. No. 7,837,964 to Wessel et al. (Wessel) describes a processes for removing sulfur compounds from hydrocarbonaceous gases by using catalysts, with the exception of activated carbons and zeolites, which comprise Cu, Ag, Zn, Mo, Fe, Co, and/or Ni oxide(s), at from −50 to 150° C. and a pressure of from 0.1 to 10 bar. While Wessel may use a CuO-containing catalyst on a support, such as $Al_2O_3$, $ZrO_2$, $SiO_2$, etc., the Wessel catalyst must contain at least 7.5 wt. % CuO as well as at least a second metal, such as Mo, Zn, and/or Ba.

While useful approaches have been developed in the art, known systems generally use complicated and/or homogenous systems, often using chelates, oxidizing agents, stabilizers, and/or particular pH ranges. A need in the market remains for improved desulfurization and/or sweetening techniques, e.g., for treating hydrocarbon and/or petrochemical gases, and apparatuses for such treatments.

SUMMARY OF THE INVENTION

Aspects of the invention include methods of reducing an initial $H_2S$ content in a gas mixture, the methods comprising: passing the gas mixture, comprising $H_2S$ and a hydrocarbon, through an aqueous suspension of a solid catalyst comprising a copper salt impregnated on a support; and separating off a second gas with a reduced $H_2S$ content relative to the gas mixture, wherein the catalyst comprises more than 90 wt. % copper, based upon a total active metal content in the catalyst. Any permutation of the features herein may be combined arbitrarily, as long as recognizable as technically feasible to persons of ordinary skill in the art.

The copper salt may comprise at least 90% copper (II).

The copper salt may comprise, for example, $Cu(NO_3)_2$, $CuF_2$, $CuCl_2$, $CuBr_2$, $CuCO_3$, $Cu(HCO_3)_2$, $CuSO_4$, $CuSiF_6$, $CuSeO_3$, $CuSeO_4$, $Cu(ClO_4)_2$, $Cu(ClO_3)_2$, $Cu(IO_3)_2$, $Cu(HCO_2)_2$, $Cu(BF_4)_2$, $Cu(O_2CCH_3)_2$, $[C_6H_{11} (CH_2)_3 CO_2]_2Cu$, $Cu_2P_2O_7$, $C_{26}H_{34}O_6Cu$, $Cu(O_2C[CHOH]_{n_c}H_2OH)$ where n is 2, 3, or 4, $[Cu(NH_3)_4]SO_4$, or a mixture of two or more of any of these. The copper salt may preferably comprise $Cu(NO_3)_2$, $CuCl_2$, $Cu(CO_3)$, $Cu(HCO_3)_2$, and/or $Cu(SO_4)$, esp. $Cu(NO_3)_2$, $CuCl_2$, and/or $Cu(SO_4)$.

The support may comprise alumina, graphite, graphene, activated carbon, aluminosilicate, or a mixture of two or more of any of these. The support may comprise at least 90 wt. % alumina, based on a total weight of the support, particularly $\alpha$-$Al_2O_3$ or $\gamma$-$Al_2O_3$.

The catalyst may comprise the copper salt in an amount of from 10 to 20 wt. %, based on a total weight of the solid catalyst, preferably in an amount of from 15 to 18 wt. %.

The reduced $H_2S$ content may respectively be no more than 25 or 5 wt. % of the initial $H_2S$ content within 220 or 250 minutes of contact with the aqueous suspension at a temperature in a range of from 15 to 40° C. and a pressure of 0.9 to 1.2 bar.

The gas mixture may further comprise $CO_2$. The hydrocarbon may comprise methane, ethane, ethylene, propylene, propane, butane, butene, butadiene, and/or isobutylene. The hydrocarbon may comprise methane. The gas mixture may be natural gas.

The aqueous suspension may comprise at least 90 wt. % water, based on total liquids in the aqueous suspension. The aqueous suspension may have a temperature in a range of from 5 to 45° C. Inventive methods may be generally conducted under ambient conditions.

Aspects of the invention may provide (heterogeneous) desulfurization catalysts, comprising: a support comprising $Al_2O_3$ in an amount of at least 95 wt. %, based upon total support weight, the support being inert to desulfurization at ambient conditions; copper (II) ions upon and impregnated within the support in an amount of at least 95 wt. %, based upon total catalytically active metals in the catalyst at the ambient conditions, and a liquid comprising at least 75 wt. % $H_2O$, based upon total solvent weight.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
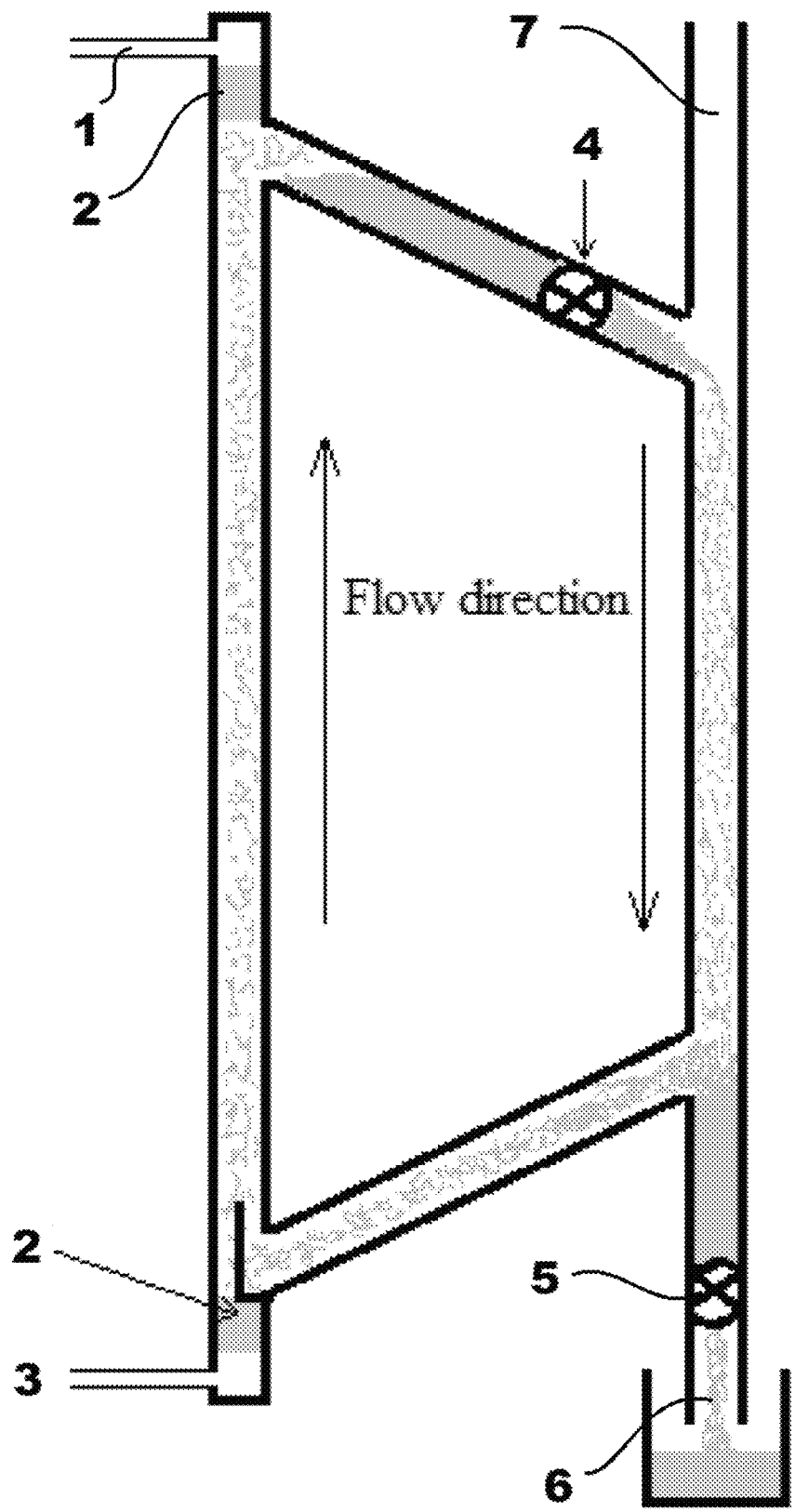
FIG. 1 shows a design of a process apparatus used for scavenging $H_2S$ from natural gas stream within the scope of the invention.

Aspects of the invention provide methods of reducing an initial $H_2S$ content in a gas mixture, the methods comprising: passing the gas mixture, comprising $H_2S$ and a hydrocarbon, through an aqueous suspension of a solid catalyst comprising a copper salt impregnated on a support; and separating off a second gas with a reduced $H_2S$ content relative to the gas mixture, wherein the catalyst comprises more than 75, 80, 85, 90, 91, 92, 92.5, 93, 94, 95, 96, 97, 97.5, 98, 99, 99.1, 99.5, or 99.9 wt. % copper, based upon a total active metal content in the catalyst. "Active metal" means those metals that react with the $H_2S$ under the process conditions, preferably at no more than 100, 75, 50, 45, 40, 35, 32.5, 30, 27.5, or 25° C., particularly under ambient conditions, i.e., STP.

The copper salt may comprise at least 90, 91, 92, 92.5, 93, 94, 95, 96, 97, 97.5, 98, 99, 99.1, 99.5, 99.9, 99.99, 99.999, or 99.9999% copper (II). The copper salt may comprise or be selected from the group consisting of, for example, $Cu(NO_3)_2$, $CuF_2$, $CuCl_2$, $CuBr_2$, $CuCO_3$, $Cu(HCO_3)_2$, $CuSO_4$, $CuSiF_6$, $CuSeO_3$, $CuSeO_4$, $Cu(ClO_4)_2$, $Cu(ClO_3)_2$, $Cu(IO_3)_2$, $Cu(HCO_2)_2$, $Cu(BF_4)_2$, $Cu(O_2CCH_3)_2$, $[C_6H_{11} (CH_2)_3CO_2]_2Cu$, $Cu_2P_2O_7$, $C_{26}H_{34}O_6Cu$, $Cu(O_2C[CHOH]_nCH_2OH)$ where n is 2, 3, or 4, $[Cu(NH_3)_4]SO_4$, or a mixture of two or more of any of these. The copper salt may preferably comprise $Cu(NO_3)_2$, $CuCl_2$, $Cu(CO_3)$, $Cu(HCO_3)_2$, and/or $Cu(SO_4)$, esp. $Cu(NO_3)_2$, $CuCl_2$, and/or $Cu(SO_4)$. The copper salt should generally have some solubility in water or a solvent system, in order to be impregnated into the support.

The support may comprise alumina, graphite, graphene, activated carbon, aluminosilicate, or a mixture of two or more of any of these. The support may comprise at least 90, 91, 92, 92.5, 93, 94, 95, 96, 97, 97.5, 98, 99, 99.1, 99.5, 99.9, 99.99, 99.999, or 99.9999 wt. % alumina, based on a total weight of the support, though $\alpha\text{-}Al_2O_3$ or $\gamma\text{-}Al_2O_3$ have shown particular utility. The support may be a mixture of alumina types.

The catalyst may comprise the copper salt in an amount of from 10 to 20, 12.5 to 19, 15 to 18.5, 16, 17, or 18 wt. %, based on a total weight of the solid catalyst.

The reduced $H_2S$ content may respectively be no more than 25 (or 5) wt. % of the initial $H_2S$ content within 220 (or 250) minutes of contact with the aqueous suspension at a temperature in a range of from 15 to 40° C. and a pressure of 0.9 to 1.2 bar. The reduction of $H_2S$ for exemplary two or three-phase arrangements can be seen in FIG. 6, which shows that passing gases over a solid bed more rapidly begins take up, but the three-phase system ultimately more rapidly removes the $H_2S$. $H_2S$ removal may be at least 75, 80, 85, 90, 91, 92, 92.5, 93, 94, 95, 96, 97, 97.5, 98, 99, 99.1, 99.5, or 99.9 wt. %, relative to the initial $H_2S$ content, within 325, 315, 310, 305, 300, 290, 275, 265, 250, 245, 240, 235, 230, 225, 220, 215, 210, or 200 minutes of exposure to the three-phase system under ambient conditions. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300, 400, 500, 600, 750, or 900° C.

The gas mixture may further comprise $CO_2$, and the $CO_2$ may be present in 2, 5, 10, 15, 20, 25, 30, 40, 50, 60, 65, 75, 85, 100, 150, 200, 250-fold the amount, or more, of the $H_2S$ based on moles. The gas mixture may further contain $N_2$, CO, Ar, $H_2$, He, $NH_3$, $O_2$, and/or $O_3$, but may exclude any or all of these.

The hydrocarbon may comprise methane, ethane, ethylene, propylene, propane, butane, butene, butadiene, and/or isobutylene. The gas mixture may be syn gas. The hydrocarbon may further or alternatively include dimethyl ether, ethyl methyl ether, neopentane. The hydrocarbon may comprise at least 25, 33, 45, 50, 60, 65, 70 75, 80, 85, 90, 92.5, 95, 97.5, 98, 99, 99.1, 99.5, or 99.9 wt. % methane, ethane, ethylene, propylene, propane, butane, butene, butadiene, and/or isobutylene, based on the total hydrocarbons. The gas mixture may be natural gas. The hydrocarbon may contain ethane and ethylene, or propane and propylene The aqueous suspension may comprise at least 75, 80, 85, 90, 92.5, 95, 97.5, 98, 99, 99.1, 99.5, or 99.9 wt. % water, based on total liquids in the aqueous suspension, but may, in addition or in place of water, contain ethylene glycol, methanol, ethanol, propanol, isopropanol, n-butanol, ethyl acetate, pet ether, pentane, hexane(s), decalin, THF, dioxane, toluene, xylene(s), and/or o-dichlorobenzene.

The aqueous suspension may have a temperature in a range of from 5 to 45, 10 to 40, 15 to 35, 20 to 30, or 22.5 to 27.5° C. Inventive methods may be conducted under ambient conditions, e.g., having such temperatures or pressures of no more than 1.5, 1.4, 1.3, 1.2, 1.1, 1.075, 1.05, 1.04, 1.03, 1.025, 1.02, or 1.015 bar.

Aspects of the invention may provide (heterogeneous) desulfurization catalysts, comprising: a support comprising $Al_2O_3$ in an amount of at least 90, 91, 92, 92.5, 93, 94, 95, 96, 97, 97.5, 98, 99, 99.1, 99.5, or 99.9 wt. %, based upon total support weight, the support being inert to desulfurization at ambient conditions; copper (II) ions upon and impregnated within the support in an amount of at least 90, 91, 92, 92.5, 93, 94, 95, 96, 97, 97.5, 98, 99, 99.1, 99.5, 99.9, 99.99, or 99.999 wt. %, based upon total catalytically active metals in the catalyst at the ambient conditions, and a liquid comprising at least 50, 60, 70, 75, 80, 85, 90, 95, 96, 97, 97.5, 98, 99, 99.1, 99.5, or 99.9 wt. % $H_2O$, based upon total solvent weight. In addition or in place of water, the liquid may contain ethylene glycol, methanol, ethanol, propanol, isopropanol, n-butanol, ethyl acetate, pet ether, pentane, hexane(s), decalin, THF, dioxane, toluene, xylene(s), and/or o-dichlorobenzene. That is, as above, the "aqueous" suspension may contain a minority fraction of, or even no, water. The support may contain alternate materials, as above, but generally need not use doped or ion-exchanged alumina (such as those modified with Ce) or zeolites, and may use unmodified (commercially available) materials.

Any of the following features, like those above, may be explicitly combined in any permutation in catalysts within the scope of the invention. Inventive catalysts need not, but may largely exclude aldehydes, i.e., comprise no more than 25, 20, 15, 10, 5, 4, 3, 2, 1, 0.5, 0.1, 0.001, or 0.0001 wt. % or no more than trace detectable amounts of aldehyde(s). Likewise or separately, the catalysts may comprise no more than 25, 20, 15, 10, 5, 4, 3, 2, 1, 0.5, 0.1, 0.001, or 0.0001 wt. % or no more than trace detectable amounts of carboxylate(s). Likewise or separately, the catalysts may comprise no more than 25, 20, 15, 10, 5, 4, 3, 2, 1, 0.5, 0.1, 0.001, or 0.0001 wt. % or no more than trace detectable amounts of amine(s), esp. tertiary amine(s), and/or amino acid(s).

Aside from copper (ions) amongst the active catalyst metals, inventive catalysts need not, but may contain fewer than 50, 33, 25, 20, 15, 10, 7.5, 5, 2.5, 2, 1, or 0.1 wt. %, relative to total active metals, of Zn, Co, W, Ca, Cd, Sn, Mn, Li, Mg, Se, Sr, Fe, Pt, Rh, Ni, Pd, Ru, V, and/or Ir. Inventive catalysts need not, but may contain fewer than 50, 33, 25, 20, 15, 10, 7.5, 5, 2.5, 2, 1, or 0.1 wt. %, relative to total active metals, of any other metals besides copper. Inventive catalysts may avoid, i.e., contain no Claus catalyst ($TiO_2$ and/or $Al_2O_3$), or may contain no more than 10, 5, 2.5, 1, 0.5, 0.1, 0.001 wt. %, relative to total solid catalyst weight, of Claus catalyst(s). Inventive catalysts may contain fewer than 10, 5, 2.5, 1, 0.5, 0.1, 0.001 wt. % metal oxides, and/or less than 7.5, 5, 2.5, 1, or 0.5 wt. % CuO, relative to total solid catalyst weight. The supports may contain less than 10, 5, 2.5, 1, 0.5, 0.1, 0.001 wt. % $CeO_2$ and/or any forms of cerium in support, relative to total support weight. Inventive catalysts may contain no more than 33, 30, 27.5, 25, 22.5, 21, or 20 wt. % active metal in the catalyst, relative to a total weight of metal and support.

While not necessarily, inventive catalysts (or compositions comprising the desulfurization/de-$H_2S$ catalyst may comprise no nitrite, or may comprise no more than 40, 33, 25, 20, 15, 10, 7.5, 5, 4, 3, 2, 1, or 0.5 wt. %, relative to the total solid catalyst/composition weight, of nitrite. Copper nitrites may be selectively excluded. Likewise or separately, inventive catalysts/compositions may contain no more than 33, 25, 20, 15, 10, 7.5, 5, 4, 3, 2, 1, or 0.5 wt. %, relative to the total solid catalyst/composition weight, of oxidizing agents, e.g., peroxide(s), hydroperoxide(s), peracid(s), and/or ozone. Inventive catalysts/compositions may comprise no more than 40, 33, 25, 20, 15, 10, 7.5, 5, 4, 3, 2, 1, or 0.5 wt. %, relative to the total solid catalyst/composition weight, of amino acid, aspartate, carbonate, citrate, gluconate, sulfate, and/or yeast, or may entirely avoid any or all of these, for example, beyond inevitable traces. Inventive catalysts may comprise no chelates, e.g., amine and/or phosphorous-containing chelates, and/or monodentate and/or bidentate and/or tridentate chelates, or may comprise no more than 40, 33, 25, 20, 15, 10, 7.5, 5, 4, 3, 2, 1, or 0.5 wt. %, relative to the total solid catalyst/composition weight, of any or all such chelates.

Inventive reactions, reactors, treatment vessels, and/or reaction systems may not require stirring at all, or may be carried out with shearing no more than 20,000, 10,000, 5,000, 2,500, 1,000, 750, 500, 400, 300, 250, 200, 150, 125, 100, 75, 50, 25, or 10 Hz. Inventive reactions, reactors, treatment vessels, and/or reaction systems may employ baffles or static flow agitators/interrupters.

Apparatuses for sweetening relevant gas mixtures may include: a first column and a second column, each being substantially vertical and parallel to each other, e.g., no more than 80, 85, 88, or 89° skew between their angular projections; an upper connector; and a lower connector. While not necessarily 90° from the ground (or a base), the vertical columns will generally be within 10, 5, 2, or 1° of orthogonality to the base, and are referred to as "vertical" for brevity herein. The connectors may connect the first and second vertical columns to create a loop, with an upper connector going from an upper portion of the first vertical column to an upper portion of second vertical column (generally lower in height than the interface at the first vertical column). The lower connector may go from a lower portion of the second vertical column to a lower portion of first vertical column (generally lower in height than the interface at the second vertical column). The upper connector may be inclined downward from the first to second vertical column, and/or the lower connector may be inclined upward from the first to second vertical column, e.g., making a trapezoidal elevational view, as seen in FIG. 1. The upper and/or lower connector may be angled, negatively or positively, within 45, 30, 22.5, 15, 7.5, 5, 3, or 1° of a parallel to the base of the apparatus, but may even be parallel to the base (orthogonal to the vertical column). The reactive length of the first vertical column(s) may have a ratio to that of the second vertical column(s) in a range of from 5 to 1:1, 4 to 1.1:1, 3 to 1.2:1, 2 to 1.25:1, or 1.75 to 1.3:1. That is, the first vertical column will generally have a greater reactive length than the second, though the first and second vertical column(s) may have the same physical length/height. Typically, only the first vertical column will use phase separators, such as fritted glass barriers, at least towards the bottom of the first vertical column, where a gas inlet may be located. The first and second vertical column(s) may have identical cross-sectional areas in flow direction, or the cross-sectional areas may be, for example, 1:1.05 to 3, 1:1.1 to 2.5, 1:1.25 to 2, which ratios may be modified based upon the relative count of first and second vertical column(s).

Inventive apparatuses may include 1, 2, 3, 4, or 5 further connector(s) along the height of the vertical columns. The upper and lower connectors will generally be attached at no more than 25, 20, 15, 10, or 5% (length) from the first vertical column bottom and/or top, based on the entire length of the first vertical column. The upper and lower connectors will generally be attached at no less than 10, 15, 20, 25, 30, 35, or 40% (length) from the second vertical column bottom and/or top, based on the entire length of the second vertical column. The upper and lower connector(s) may have identical cross-sectional areas to each other and/or first vertical column(s) and/or second vertical column(s), in flow direction, or the upper to lower connector cross-sectional areas may be, for example, 1:0.5 to 2, 1:0.75 to 1.5, 1:0.9 to 1.25, with the first and/or second vertical column(s) generally having 1.1, 1.25, 1.5, 2, or 2.5-fold greater cross-sectional areas. A diameter of the vertical column(s) may be in a range of from 1 cm to 3 m, depending upon the application, e.g., at least 0.5, 0.75, 1, 1.5, 2, 3, 5, 10, 25, 50, or 100 cm, and/or up to 5, 4, 3, 2.5, 2, 1.5, 1.25, 1, 0.75 m.

The vertical columns and/or connectors generally contain a liquid or gas/liquid phase, such as water, an aqueous solution, an organic solution, or a split/emulsified organic-aqueous mixture, including the inventive catalyst suspended therein. Roughly 20 to 50 wt. % of the liquid/catalyst mixture may be contained in the first vertical column(s), with 20 to 40 wt. % in the second vertical column(s), and 20 to 30 wt. % in the connectors. The liquid/catalyst suspension, when spent, may collect in a bottom portion of the second vertical column(s), which may be below the bottom connector interface with the second vertical column and may constitute up to 2, 5, 10, 15, or 20% of the second vertical column's volume. The feed gas for sweetening may be led through a column of liquid/catalyst suspension occupying 20 to 99, 33 to 95, 50 to 90, 60 to 85, or 66 to 75% of the first vertical column's total volume. The liquid/catalyst suspension may gather in the upper connector, optionally behind a valve, and/or may flow through, generally downwards in the upper connector into the second vertical column, and again downwards in the lower connector to a lower portion of the first vertical column, to be driven upwards by the gas feed and/or one or more pumps.

The spent catalyst/liquid may be held up with a valve and/or may be led off to a regeneration, e.g., as set forth in U.S. Pat. No. 8,002,971 or U.S. Pat. No. 8,071,146, each of which is incorporated in its entirety by reference herein. Plant layouts including inventive apparatuses may advantageously avoid, e.g., amine contactors and/or basic sweeteners, or may allow 5, 10, or 20 wt. % less base to be used in sweetening.

Inventive apparatuses may include 1, 2, 3, 4, 5, or more of the vertical column(s), connector(s), gas inlet(s), gas outlet(s), catalyst inlet(s), and/or catalyst outlet(s), and the duplicated and/or multiple elements may be unified in any manner advantageous for the given application, e.g., 5 first vertical columns into 1 or 2 common upper connector(s) into, e.g., 4 or 3 second vertical column. The columns and connectors may have circular, square, and/or ovular cross-sections, and may include, e.g., annular portions inflecting radially inwardly and/or outwardly towards the cross-sectional center. A flux of the feed gas through the liquid/catalyst suspension may be in a range of from 0.1 to 25, 0.5 to 15, 1 to 10, 1.5 to 7.5, or 2 to 5 mL/s for a 1 cm cross-sectional diameter vertical column.

Inventive methods may operate at pHs in the neutral range and/or above 4, though the efficiency of the $H_2S$ removal should be within 90% across the pH range of 2 to 13, 3 to 11, 4 to 10, 5 to 8, or 6 to 7.5. No particular considerations need to be taken regarding pH, and acceptable reaction pHs will generally be at the ambient/natural conditions of water available. Inventive methods may operate under 700, 500, 350, 200, 180, 90, or 40° C. The method may preferably be operated at the environmental conditions at the site of implementation, e.g., at or within 1000, 750, 500, 250, 200, 150, 100, 50, or 20 meters of a natural gas source, an oil source, a hydrocarbon platform, an LNG storage facility, an LNG transport tanker, a petrochemical plant, a refinery, a polymerization reactor, a cracker, a PSA, an MTG plant, and/or an MTO plant.

Aspects of the invention provide two or three-phase processes for scavenging $H_2S$ from hydrocarbon gas mixtures, i.e., a gas comprising a hydrocarbon and $H_2S$, such as a sour natural gas stream, syn gas, cracking off-gases, exhausts, crude or at least partially purified methane, ethane, ethylene, propylene, propane, butane, butene, butadiene, and/or isobutylene gas(es). Gas phases may comprise $H_2S$, $CO_2$, and a hydrocarbon, e.g., methane. Liquid phases within the invention, when present, may comprise or consist essentially of water, i.e., at least 75, 80, 85, 90, 91, 92, 92.5, 93, 94, 95, 96, 97, 97.5, 98, 99, 99.1, 99.5, 99.9, 99.99, 99.999, or 99.9999 wt. % of a total weight of the liquid phase weight being water. Solid phases generally contain a copper catalyst impregnated on alumina, wherein the catalyst metal may comprise at least 75, 80, 85, 90, 92.5, 95, 97.5, 98, 99, 99.1, 99.5, or 99.9 wt. % Cu relative to total metals, and/or the support may comprise alumina in amount of at least 75, 85, 90, 92.5, 95, or 97.5 wt. % of the support total weight. The gas(es) may be bubbled through a two-phase bed and/or into the three-phase column, contacting the dispersed solid phase, i.e., supported copper-based catalyst, in an air or at least partially inert atmosphere or within the bulk of liquid phase, e.g., water, an aqueous mixture/solution, an organic phase, etc.

Concentrations of $H_2S$ in exit gas stream(s) may be monitored continuously, enabling the construction of $H_2S$ breakthrough curves and the calculation of the amount of $H_2S$ scavenged.

The copper-based catalyst may be prepared by a wet incipient method, i.e., capillary impregnation or dry impregnation, typically comprising dissolving active metal precursor(s) in an aqueous or organic solution, adding the metal-containing solution to a catalyst support, optionally having the same pore volume (or within 50, 33, 25, 15, 10, or 5%) as the volume of the added solution, and allowing capillary action to draw the solution into the pores. In wet incipient methods excess solution (beyond the support pore volume) can cause the solution transport to change from a capillary action process to a slower diffusion process. Catalysts can then be dried and calcined to drive off the volatile components within the solution, depositing the metal on the catalyst surface. Maximum loading is generally limited by the solubility of the precursor in the solution. Concentration profiles of impregnated compound(s) depend on mass transfer within the pores during impregnation and drying.

Inventive catalysts are generally selective towards the acid gas, i.e., $H_2S$, and thus the presence of hydrocarbon gases in the gas feed generally will not affect the efficacy of inventive catalyst(s). Selectivities may be in a range of 1.5 to 100, 2 to 50, 3 to 25, based on relative kinetic reaction rate constants. Three-phase processes showed surprising superiority over two-phase (gas-solid) fixed-bed processes in terms of the amount of $H_2S$ scavenged and breakthrough time. Inventive two and three-phase processes are effective at ambient conditions, and the catalyst is typically regenerable.

Aspects of the invention may provide (i) complete dissolution (or leaving less than 15, 10, 7.5, 5, 2.5, 2, 1, 0.1, 0.01, 0.001, or 0.0001 wt. %, based on the feed gas, or even no more than detectable limits) of $H_2S$ from a hydrocarbon gas stream, such as natural gas, into the solid-liquid system; (ii) the use of three phase sorbent/catalyst method and/or apparatus to scavenge $H_2S$, i.e., gas/liquid/solid; (iii) use of copper impregnated on alumina as catalyst for reduction of $H_2S$ in aqueous solution; and/or (iv) synergetic effect(s) of adsorption-absorption of $H_2S$ on the rate of $H_2S$ reduction.

Inventive methods may involve loading one or more copper salts, such as $Cu(NO_3)_2$, $CuF_2$, $CuCl_2$, $CuBr_2$, $CuCO_3$, $Cu(HCO_3)_2$, $CuSO_4$, $CuSiF_6$, $CuSeO_3$, $CuSeO_4$, $Cu(ClO_4)_2$, $Cu(ClO_3)_2$, $Cu(IO_3)_2$, $Cu(HCO_2)_2$, $Cu(BF_4)_2$, $Cu(O_2CCH_3)_2$, $[C_6H_{11}(CH_2)_3CO_2]_2Cu$, $Cu_2P_2O_7$, $C_{26}H_{34}O_6Cu$, $Cu(O_2C[CHOH]_n CH_2OH)$ where n is 2, 3, or 4, $[Cu(NH_3)_4]SO_4$, etc., onto surfaces of support(s) comprising alumina, e.g., $\gamma$-$Al_2O_3$, $\alpha$-$Al_2O_3$, graphite, graphene, activated carbon, or aluminosilicates (with various alumina-silica ratios). Loading percentages of the catalyst on the support(s) may be as high as 33, 25, 20, 18, 15, 12.5, or 10 wt. %, considering all catalytic metals on the support (or in the catalyst compound). Catalyst precursor solutions may comprise water in at least 75, 80, 85, 90, 92.5, 95, 97.5, 98, 99, 99.1, 99.5, or 99.9 or more wt. %, but may also comprise water mixed with a chelating agent, or copper complexes, such as copper (II)-n,n-diethylethylenediamine, [CuLn]—$(BAr_4)_2$—wherein Ln is ligand, B is boron, and Ar is aryl etc.).

Inventive catalysts may be used (1) directly in a fixed bed adsorbent for scavenging $H_2S$ from sour gas stream, i.e., 50, 60, 70, 75, 80, 85, 90, 95, 98, 99, 99.99 or more % solvent free; (2) mixed in a liquid (sorbent solution), the sour gas being allowed to bubble through the sorbent solution; (3) in counter-current circulation of the mixed catalyst-solution with the sour gas stream; and/or (4) co-current circulation of the mixed catalyst-solution with the sour gas stream. Counter-current and co-current circulations may be implemented in parallel and/or in series. Exit gas concentrations may be measured as a function of time and breakthrough curves may be recorded, with differences between feed and exit stream $H_2S$ concentrations representing the amount of $H_2S$ scavenged.

In an inventive plant arrangement, an optionally preheated $H_2S$-containing feed may flow through a heater where the feed mixture is totally vaporized and heated to the required temperature before entering the reactor and flowing through a fixed-bed and/or liquid layer of inventive catalyst where the hydrodesulfurization (HDS) reaction takes place. The HDS reaction products may be at least partially cooled, if necessary, by flowing through the heat exchanger where the reactor feed was preheated and then through, e.g., a water-cooled heat exchanger before optional (de) pressurization and/or gas separation. Rather than, or in addition to, routing gas from a gas separator vessel, through an amine contactor for removal of the reaction product $H_2S$, this gas may be passed through at least one inventive sweetening apparatus. The $H_2S$-free gas may then be sent to further processing and/or an end use.

Sour gas, e.g., from a stripper or from a hydrocarbon source may contain $H_2$, $CH_4$, $C_2H_6$, $H_2S$, $C_3H_8$, $C_3H_6$, $C_4H_{10}$, butene(s), pentene(s), and/or heavier components. Sour gas, particularly containing $H_2S$, but optionally also organic thiols, sulfides, disulfides, thiophenes, and sulfur oxides, from basically any source may be sent to a gas processing plant comprising an inventive sweetening apparatus for removal of the $H_2S$. After the $H_2S$ is removed in the inventive sweetening apparatus, and optionally further in an amine gas treating unit, the sweetened gas may be optionally passed through a series of distillation towers to recover and/or isolate hydrocarbon components, such as methane, ethane, ethylene, propane, propylene, butane, pentane, and/or heavier components. The $H_2S$ removed/recovered by the inventive sweetening apparatus(es), and any amine gas treating unit(s), may be subsequently converted to elemental sulfur in a Claus Process unit or to sulfuric acid in a wet sulfuric acid process and/or in a conventional Contact Process.

WORKING EXAMPLES

Example 1. A fixed mass (0.05 g) of solid copper catalyst is placed in a 1.5 mm jacketed glass tube. Glycol solution was circulated to maintain the desired reaction temperature (e.g., room temperature of −22° C.)±1° C. Synthetic natural gas streams containing variable concentrations of $H_2S$ (50, 100 ppmv), $CO_2$ (1000, 2000 ppmv) and the balance methane were introduced at different flowrates. The pressure drop across the catalyst bed was monitored using a digital pressure gauge. The concentrations of inlet and outlet $H_2S$ were measured continuously using an RAE multi-gas meter.

Example 2. The same procedure as in Example 1 was repeated but pure deionized water (10 mL) was used as a blank solution. The water was maintained in a 1-cm ID fretted glass tube.

Example 3. The same procedure as in Example 2 was repeated where copper-based catalyst-water slurry was used instead of pure water. The desired amount of copper-based catalyst (0.05 g) was dispersed in 10 mL deionized water.

Example 4. The same procedure as in Example 2 was repeated but a mixture of copper complex (0.05 g) was used instead of pure water.

Table 1

TABLE 1

Surface area and pore size analysis for Cu—$Al_2O_3$ catalyst

| Property | Value |
| --- | --- |
| BET surface area: | 62.5383 m$^2$/g |
| BJH adsorption cumulative surface area of pores between 17.000 and 3000.000 Å diameter: Å and 3000.000 Å diameter: | 68.097 m$^2$/g |
| Adsorption average pore width (4 V/A by BET): width (4 V/A by BET): | 202.9286 Å |
| BJH adsorption average pore diameter (4 V/A): | 175.833 Å |
| BJH desorption average pore diameter (4 V/A): | 153.486 Å |

Referring now to the drawings, wherein like reference numerals designate identical or corresponding parts throughout the several views.

Example 5. Process of scavenging $H_2S$. A laboratory scale process of scavenging $H_2S$ by a circulating fluidized slurry of Cu—$Al_2O_3$ is exemplified in FIG. 1. On large scale, gas stream(s) containing $H_2S$ may be introduced at one or more locations at the bottom of the fluidized reactor, i.e., below 33, 25, 20, 15, 10, 7.5, 5, 4, 3, 2, and/or 1% of the reactor height, where the slurry containing the Cu—$Al_2O_3$ and optional solvents/solutions may contact the gas stream(s) and be carried upward. Sweetened gas may then be passed through a separator element (2, upper), such as fritted glass, gauze, and/or membrane(s), etc., to one or more analyzers and/or an outlet (1). The catalyst slurry may be accumulated in an inclined portion, such as a tube, and a check slurry valve (4) may allow partial flow to maintain a specified solid-liquid ratio. For example, the solid-liquid ratio, measured as the percent solid catalyst mass per mass of liquid, may be in a range of from 0.01 to 5, 0.05 to 5, 0.1 to 4, 0.15 to 3.5, 0.2 to 3, 0.25 to 2.5, 0.3 to 2, 0.33 to 1.75, 0.35 to 1.5, 0.4 to 1.25, 0.425 to 1, 0.45 to 0.75%, e.g., 0.5 mg of catalyst may be used in 10 g of liquid. The accumulated slurry or used catalyst can be allowed to flow downwards by the effect of gravity and may be mixed with fresh catalyst and/or at least partially regenerated. The Cu—$Al_2O_3$ catalyst may be added batch-wise and/or continuously in a catalyst inlet (7) and may be added to tailor the efficiency of scavenging $H_2S$ gas and/or heat transfer, for example. Part of the slurry catalyst may be accumulated in a spent catalyst container through a valve (5), and/or sent to a recycle, while non-separated catalyst may be returned to contact the inlet gas stream (3) and cycled again with the gas stream. Spent catalyst (6) may be regenerated in a separate process by washing with oxidizing agent such as nitric acid or hydrochloric acid, washed, e.g., with water, and used again.

Figure 2:
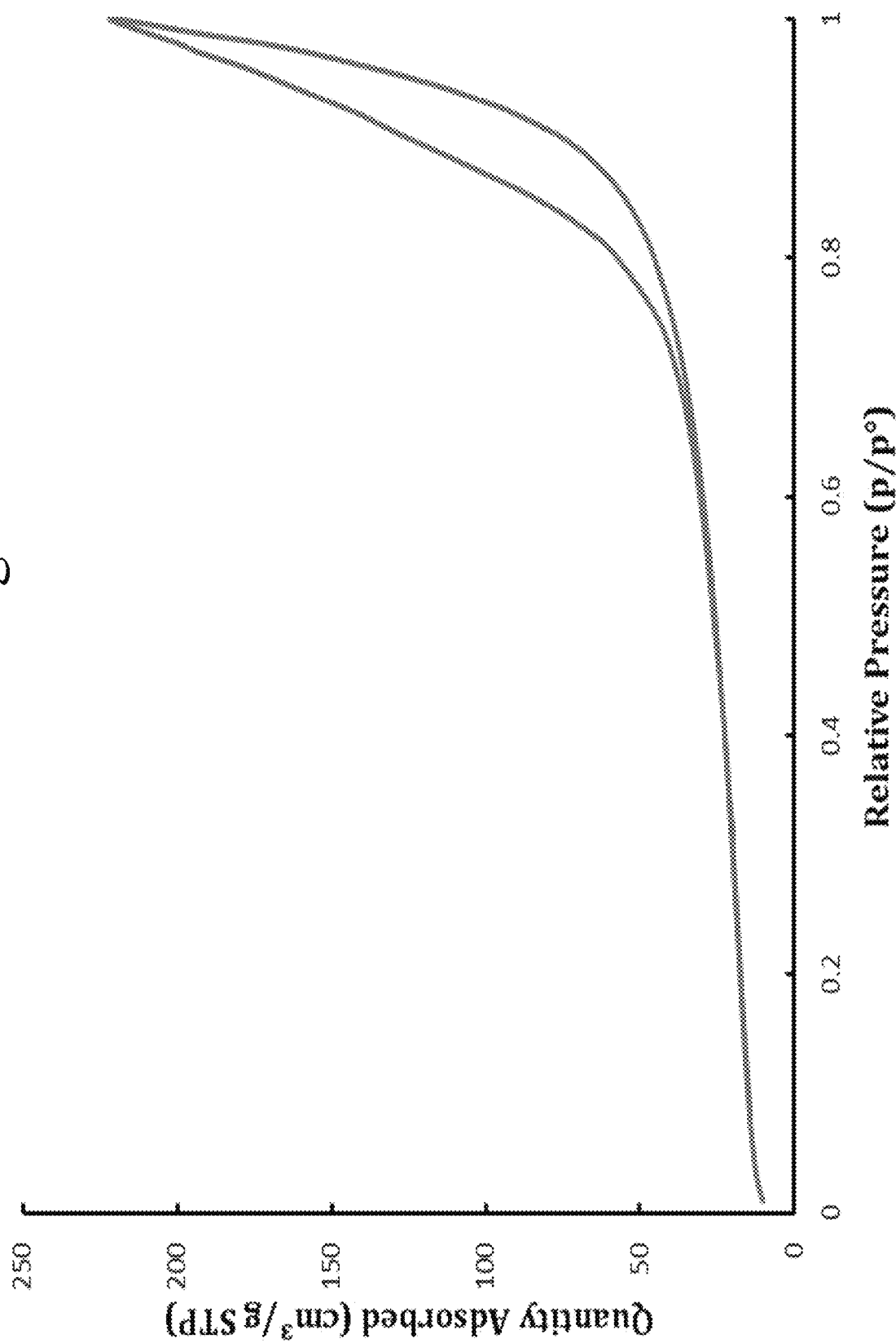
FIG. 2 shows the BET hysteresis curve for a Cu—$Al_2O_3$ catalyst useful according to the invention, which catalyst may be prepared by a wet incipient method using a copper salt.
Figure 3:
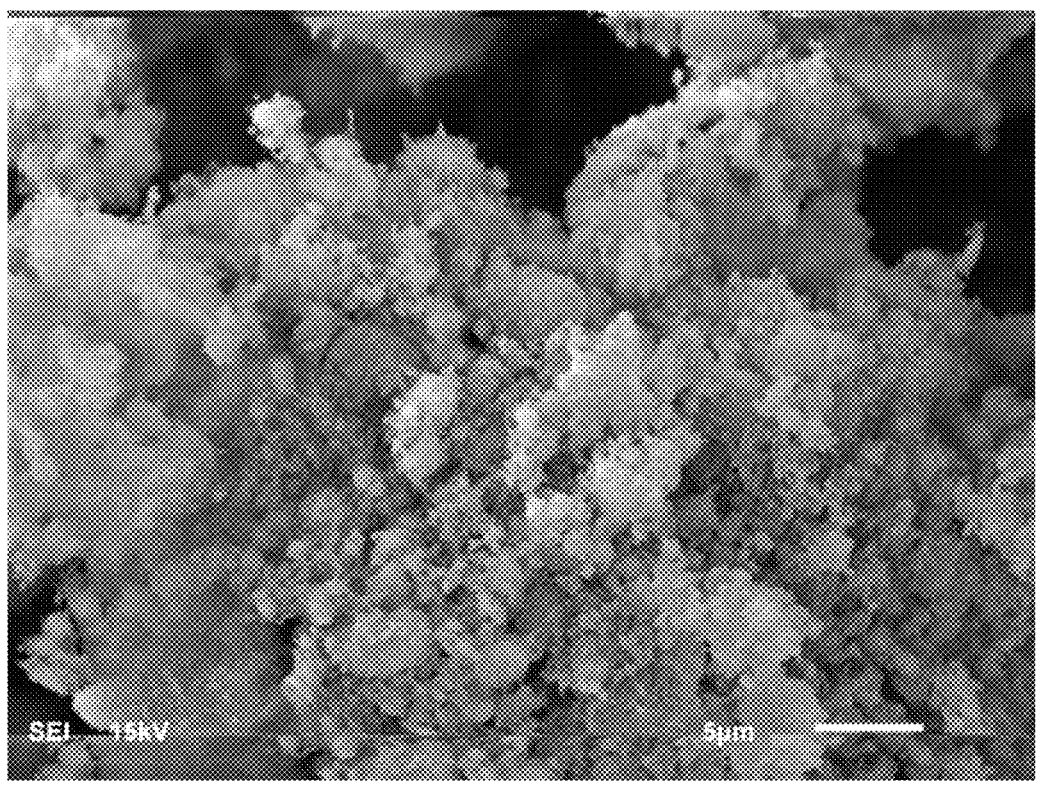
FIG. 3 shows a scanning electron microscopy (SEM) image of a Cu—$Al_2O_3$ catalyst within the scope of the invention.
Figure 4:
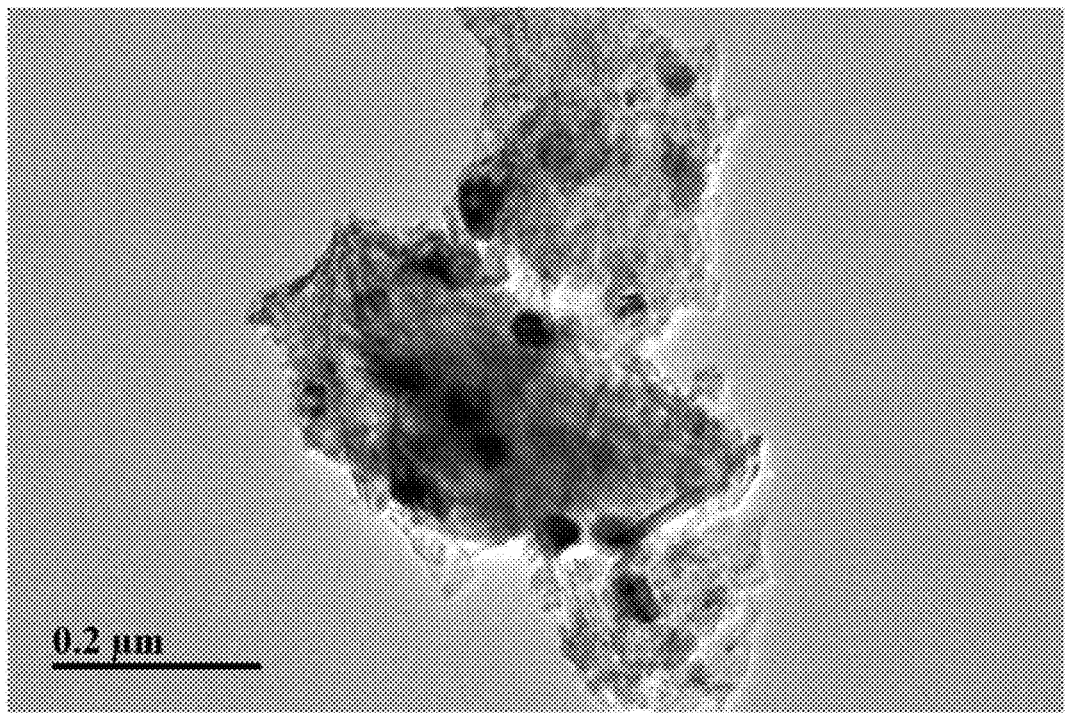
FIG. 4 shows a transmission electron microscopy (TEM) image of a Cu—$Al_2O_3$ catalyst within the scope of the invention.
Figure 5:
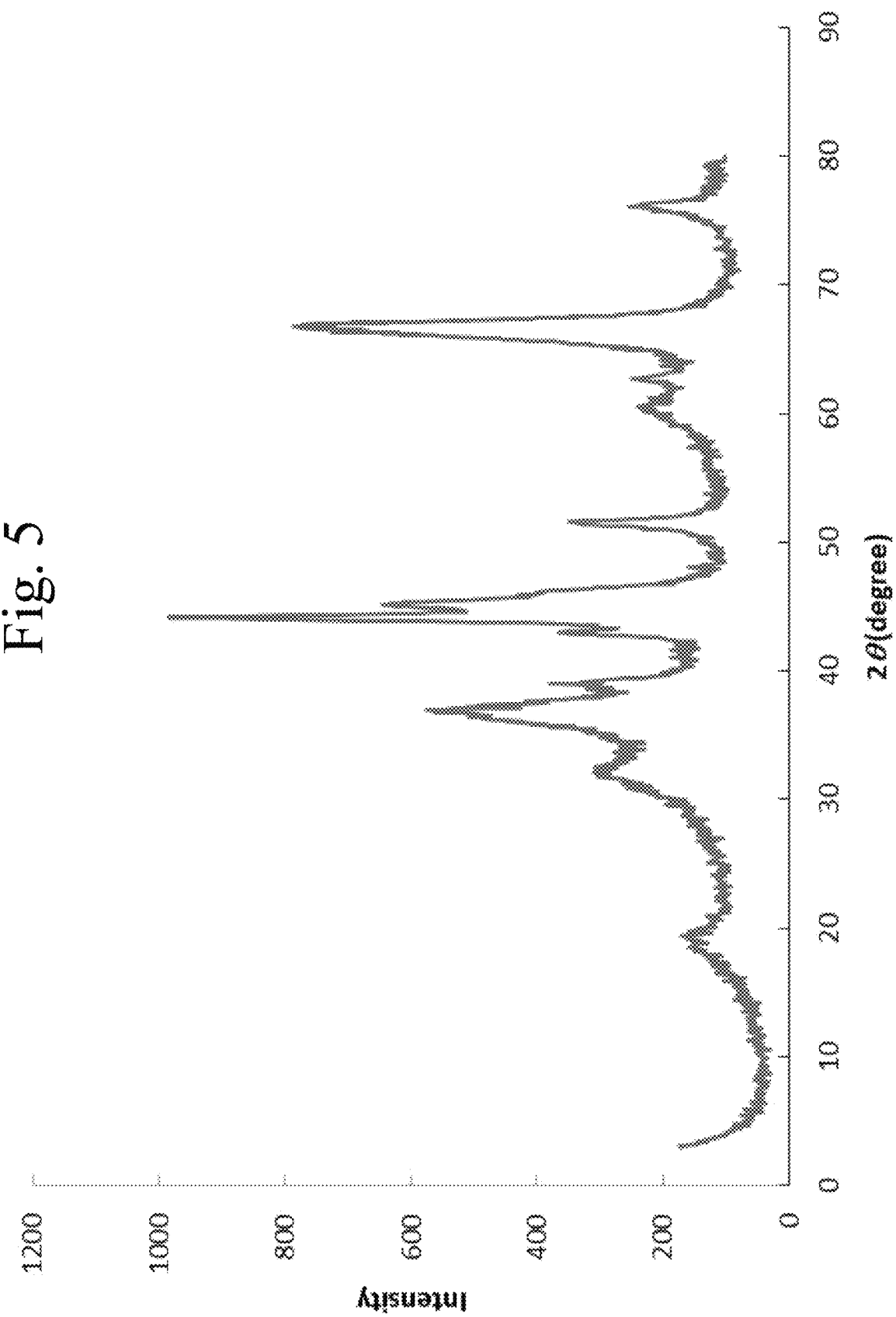
FIG. 5 shows the x-ray diffraction pattern of a Cu—$Al_2O_3$ catalyst within the scope of the invention.

FIG. 2 shows a BET hysteresis loop for a supported Cu—$Al_2O_3$ catalyst according to the invention. The catalyst was prepared by wet incipient method using a copper salt. FIGS. 3, 4, and 5 respectively shows a scanning electron microscopy (SEM) image, transmission electron microscopy (TEM) image, and x-ray diffraction pattern, of the Cu—$Al_2O_3$ catalyst.

As seen on 5 micron scale in FIG. 3, inventive catalyst may take a substantially amorphous, fractal, and/or flocculent morphology, with fuzzy outcroppings upon agglomerated masses of irregular shape. The outcroppings may have a somewhat snow-flake like appearance with roughly 1 to 3 micron widths and 2 to 5 micron lengths in 2D. FIG. 4 reveals that the catalyst particles have an irregular shape on 200 nm scale, with (in 2D) ovular and/or circular volumes of greater density spaced irregularly throughout the morphology, with occasional agglomerations of 2 to 3 spheroids, spaced by 100 nm or more from other spheroids and/or agglomerations. The 200 nm scale TEM shows a jagged outer surface of the catalyst particle/flake, apparently overlaid, with approximately 400 to 600 micron span in its longest dimension and some 200 to 300 micron span perpendicular to the longest dimension.

Figure 6:
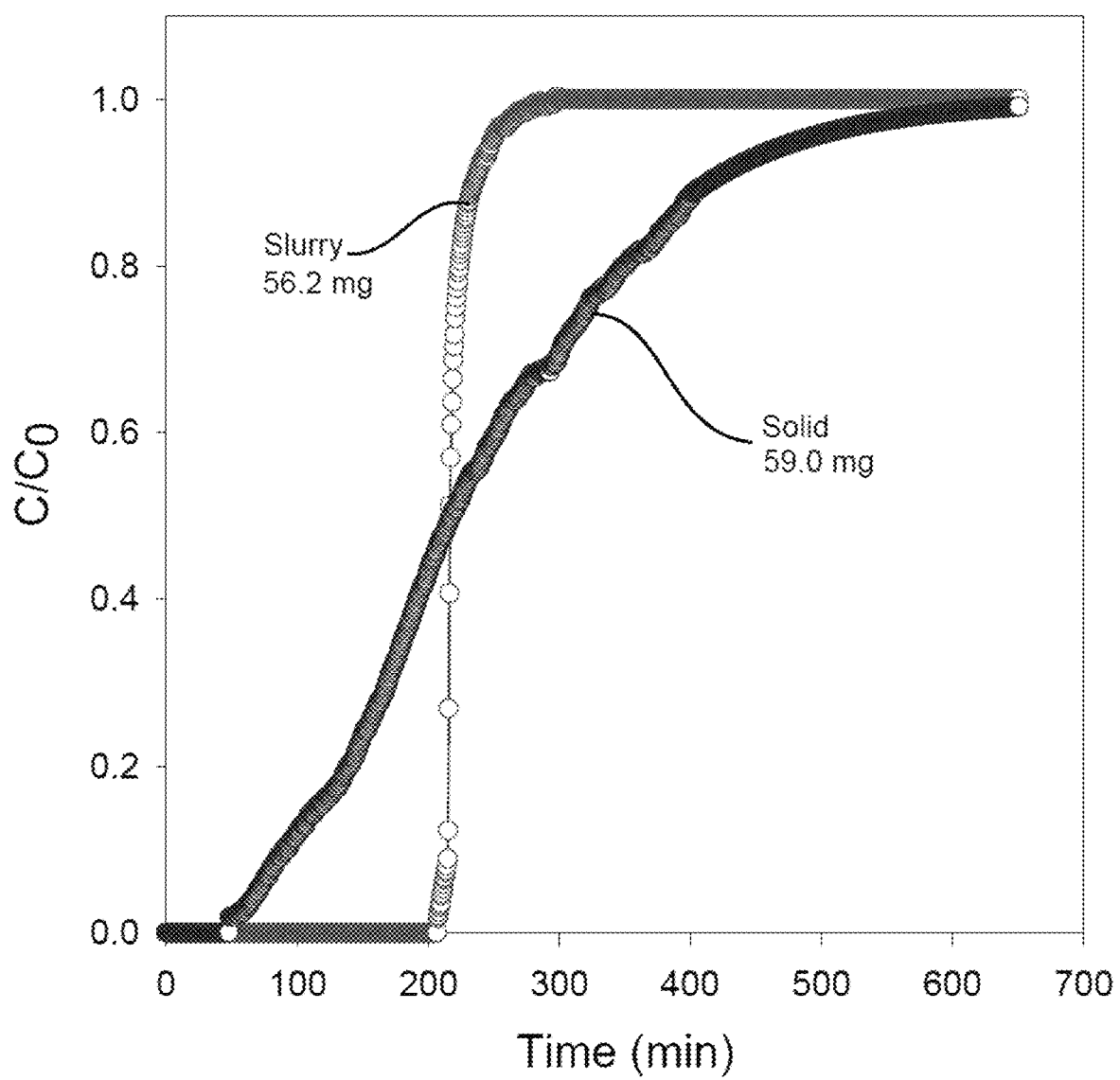
FIG. 6 shows a comparison between the $H_2S$ breakthrough curves obtained using the three-phase (gas-liquid-solid) and the two-phase processes (gas-solid) with a Cu—$Al_2O_3$ catalyst within the scope of the invention.

FIG. 5 shows 2θ peaks in the XRD of inventive catalyst at ~19° (full width at half maximum-FWHM ~5, 0.2 relative intensity—r.i.), ~33° (FWHM ~4, 0.3 r.i.), ~36° (FWHM ~4, 0.6 r.i.), ~38° (FWHM ~2, 0.4 r.i.), ~43° (FWHM ~1, 0.4 r.i.), ~45° (FWHM ~1, 1 r.i.), ~46° (FWHM ~2 with shoulder, 0.65 r.i.), ~52° (FWHM ~2, 0.35 r.i.), ~61° (FWHM ~4, 0.25 r.i.), ~63° (FWHM ~3, 0.25 r.i.), ~67° (FWHM ~3, 0.8 r.i.), and ~76° (FWHM ~2, 0.25 r.i.). FIG. 6 shows a comparison between the $H_2S$ breakthrough curves obtained using three-phase and two-phase processes. The amount of catalyst is very comparable, i.e., within 95 wt. % of each other, 4.7% for both processes, dispersed in 10 mL water, and each sour natural gas feed contained 100 ppmv $H_2S$. The scavenging process was conducted at room temperature and atmospheric pressure. While the solid, two-phase application shows and earlier adsorption of $H_2S$ and a gradual, almost linear adsorption process, the three-phase, catalyst slurried in liquid adsorbed the $H_2S$ in roughly 100 minutes, while the two-phase approach needed about 600 minutes to accomplish the same $H_2S$ removal.

Figure 7:
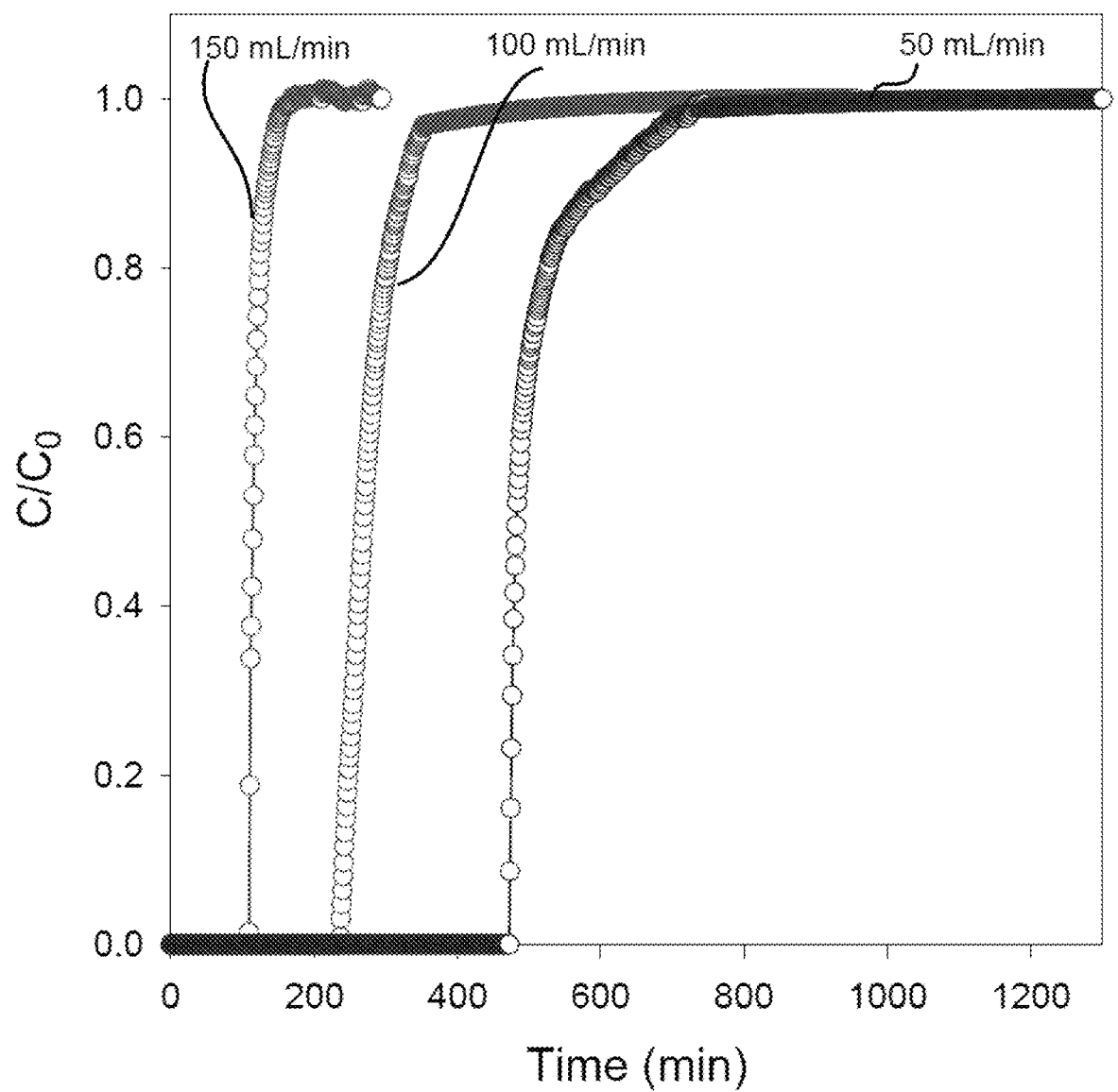
FIG. 7 shows the effect of flow-rate on $H_2S$ breakthrough curves at 50, 100, and 150 mL/min using a Cu—$Al_2O_3$ catalyst within the scope of the invention, with the feed natural gas containing 100 ppmv $H_2S$ going 50 mg copper catalyst utilized in 10 mL of water at room temperature and atmospheric pressure.

FIG. 7 shows the effect of sour gas flow rate on the $H_2S$ breakthrough curve, whereby the sour natural gas feed contained 100 ppmv $H_2S$ and the amount of supported copper catalyst utilized was about 50 mg. The catalyst is dispersed in 10 mL water. The scavenging process was conducted at room temperature and atmospheric pressure.

Numerous modifications and variations of the present invention are possible in light of the above teachings. It is therefore to be understood that within the scope of the appended claims, the invention may be practiced otherwise than as specifically described herein.

REFERENCE SIGNS 1 gas outlet
2 phase separator, e.g., fritted glass
3 gas inlet
4 check valve
5 outlet valve
6 catalyst outlet, e.g., spent catalyst or regeneration feed
7 catalyst inlet

The invention claimed is:

1. A heterogeneous desulfurization catalyst for hydrocarbon sweetening, comprising:
 a solid catalyst comprising:
  a support comprising $Al_2O_3$ in an amount of at least 95 wt. %, based upon total support weight, the support being inert to desulfurization at ambient conditions;
  copper (II) ions upon and impregnated within the support in an amount of at least 95 wt. %, based upon total catalytically active metals in the catalyst at the ambient conditions, and
 a liquid comprising at least 75 wt. % $H_2O$, based upon total solvent weight, wherein the $Al_2O_3$ is $\alpha$-$Al_2O_3$,
 wherein the copper salt is selected from the group consisting of $Cu(NO_3)_2$, $CuCl_2$ and $Cu(CO_3)$ and mixtures thereof,
 wherein the solid catalyst comprises less than 1 wt. % CuO and less than 1 wt. % Fe, based upon the total active metal content in the solid catalyst,
 wherein the solid catalyst comprises the copper (II) salt in an amount of from 16 to 17 wt. %, based on a total weight of the solid catalyst, and
 wherein the solid catalyst comprises no activated carbon.

2. The heterogeneous desulfurization catalyst of claim 1, wherein the catalyst comprises $Cu(NO_3)_2$.

3. The heterogeneous desulfurization catalyst of claim 1, wherein the catalyst comprises $CuCl_2$.

4. The heterogeneous desulfurization catalyst of claim 1, wherein the catalyst comprises $CuCO_3$.

5. The heterogeneous desulfurization catalyst of claim 1, wherein the heterogeneous desulfurization catalyst is in the form of an aqueous suspension having a solid-liquid ratio, measured as solid catalyst mass per mass of liquid, in a range of from 0.01 to 1.5.

6. The heterogeneous desulfurization catalyst of claim 5, wherein the aqueous suspension comprises at least 95 wt. % water, based on total liquids in the aqueous suspension.

7. The heterogeneous desulfurization catalyst of claim 1, wherein copper (II) ions are present in an amount of at least 99 wt. %, based upon total catalytically active metals in the catalyst.

* * * * *